United States Patent
Sakai

(10) Patent No.: US 7,199,937 B2
(45) Date of Patent: Apr. 3, 2007

(54) PROJECTION IMAGE DISPLAY APPARATUS AND COLOR CORRECTION METHOD FOR THE SAME

(75) Inventor: Fumihiko Sakai, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 15 days.

(21) Appl. No.: 11/230,824

(22) Filed: Sep. 21, 2005

(65) Prior Publication Data

US 2006/0139762 A1 Jun. 29, 2006

(30) Foreign Application Priority Data

Dec. 27, 2004 (JP) .............................. 2004-378072

(51) Int. Cl.
  *G02B 3/00* (2006.01)
  *G03B 21/00* (2006.01)
(52) U.S. Cl. ........................................ 359/649; 353/44
(58) Field of Classification Search ........ 359/649–651; 353/44
See application file for complete search history.

(56) References Cited

U.S. PATENT DOCUMENTS

| 6,229,580 | B1 * | 5/2001 | Inoue ........................ 348/649 |
| 6,674,579 | B2 | 1/2004 | Brennesholtz |
| 6,683,616 | B1 * | 1/2004 | Yamauchi et al. .......... 345/589 |
| 6,801,365 | B2 | 10/2004 | Nakamura et al. |
| 2003/0164927 | A1 | 9/2003 | Tsukada |
| 2003/0214510 | A1 | 11/2003 | Tajima |
| 2004/0239884 | A1 | 12/2004 | Nagashima et al. |
| 2004/0246589 | A1 | 12/2004 | Kim et al. |
| 2005/0024733 | A1 | 2/2005 | Richards et al. |

FOREIGN PATENT DOCUMENTS

| JP | 7-75120 | 3/1995 |
| JP | 2973477 | 9/1999 |
| JP | 2003-323610 | 11/2003 |
| JP | 2004-128575 | 4/2004 |

* cited by examiner

*Primary Examiner*—Jordan M. Schwartz
(74) *Attorney, Agent, or Firm*—Finnegan, Henderson, Farabow, Garrett & Dunner, L.L.P.

(57) ABSTRACT

A holding unit holds a plurality of types of white balance adjustment color data with respect to colors of the plurality of projection surfaces. A projection control unit causes a projection unit to simultaneously project patterns having a plurality of colors based on the plurality of types of held color data, upon dividing the patterns into areas configured to be selected for each pattern. A selection control unit causes a designation unit to select a pattern which is whitest from the patterns having the plurality of projected colors. When a given pattern is selected from the patterns having the plurality of colors projected, a color data acquiring unit acquires color data corresponding to the selected pattern from the plurality of types of held color data. A color correction unit performs color correction of an image to be projected.

5 Claims, 7 Drawing Sheets

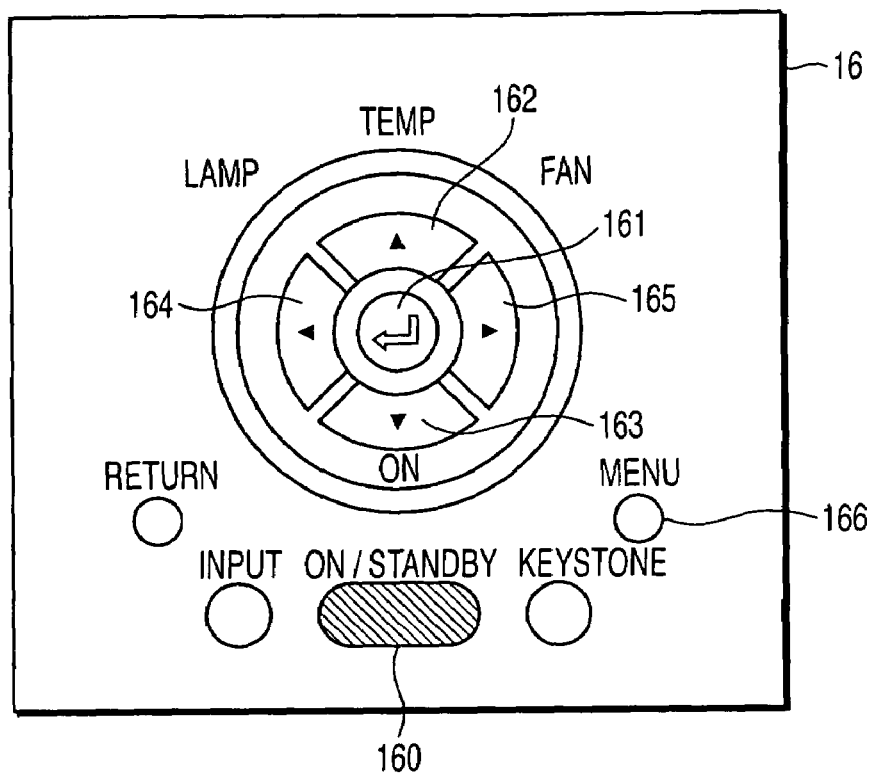
F I G. 4A
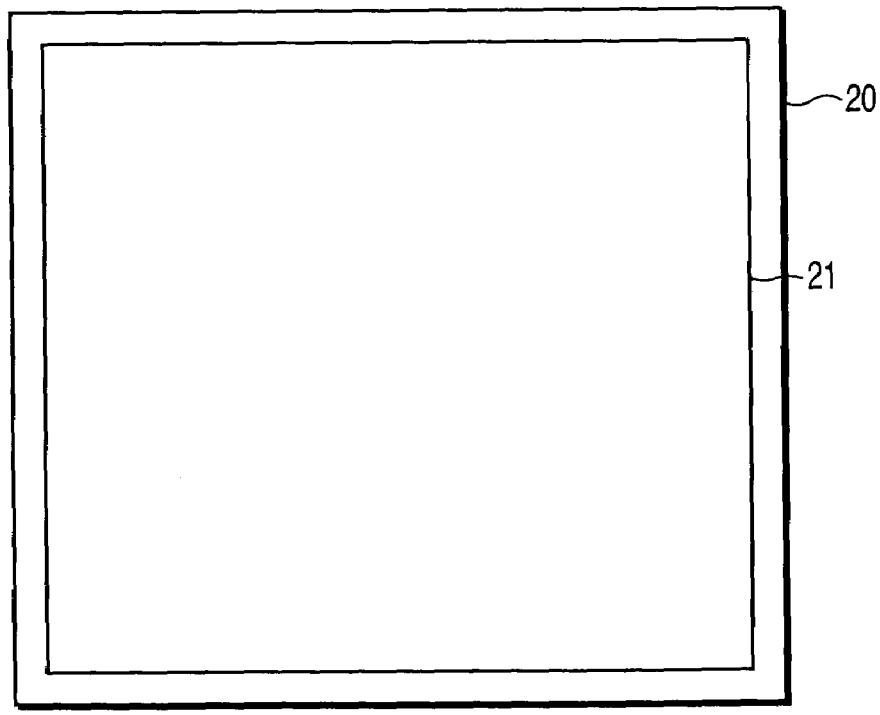
F I G. 4B

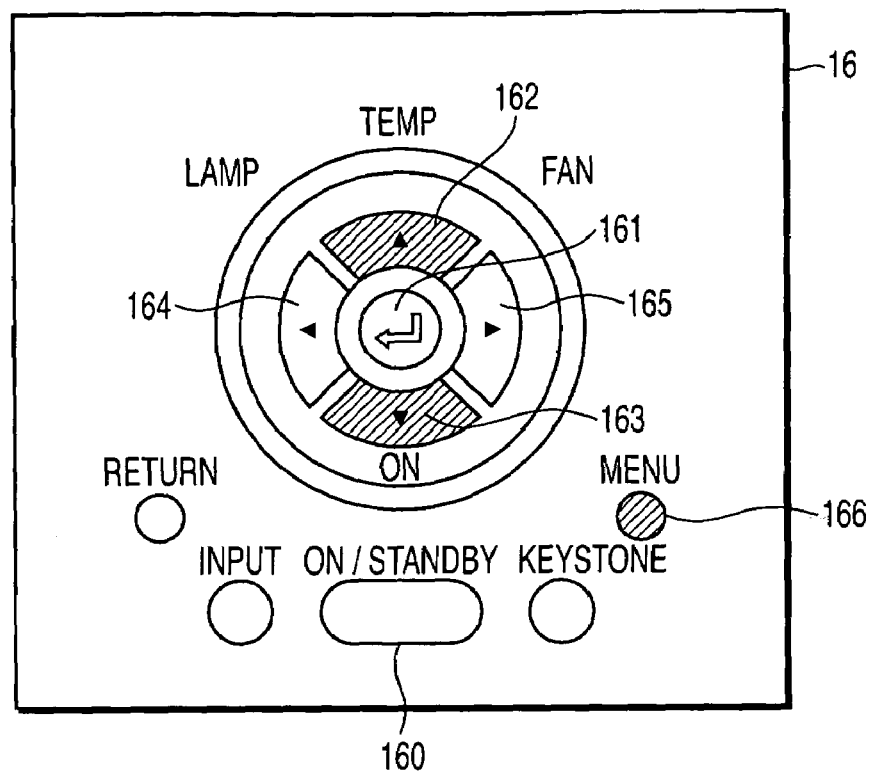
F I G. 5A
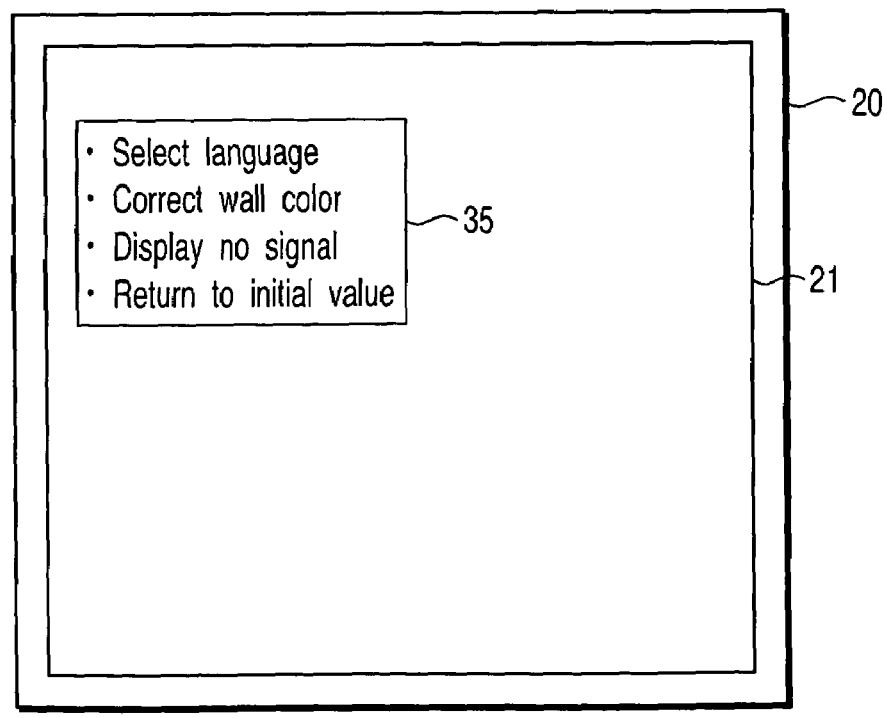
F I G. 5B

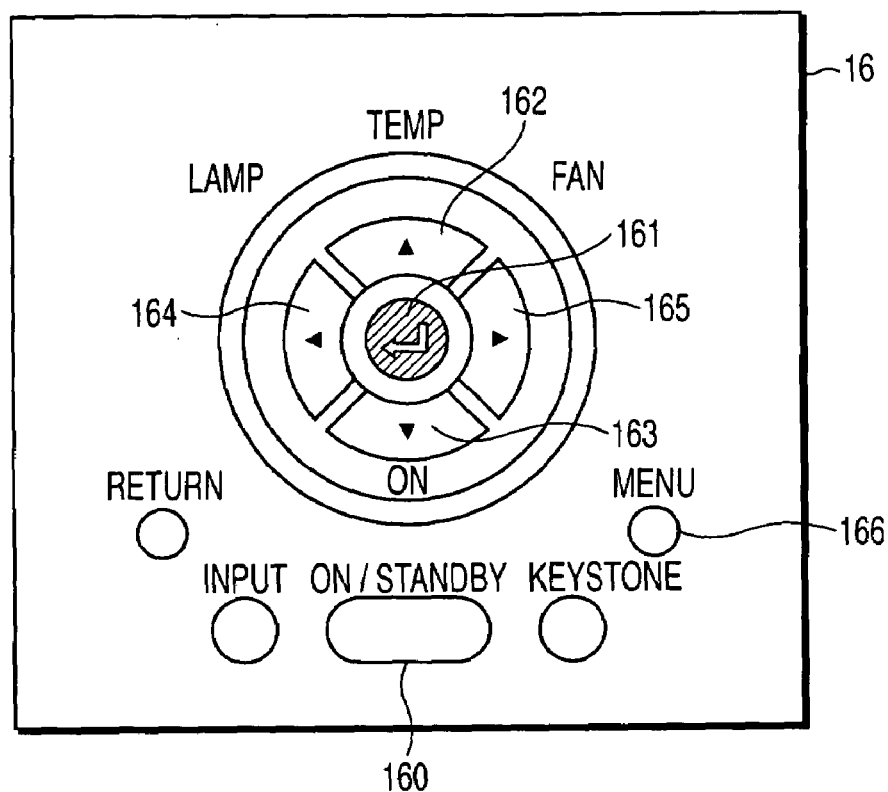
F I G. 7A
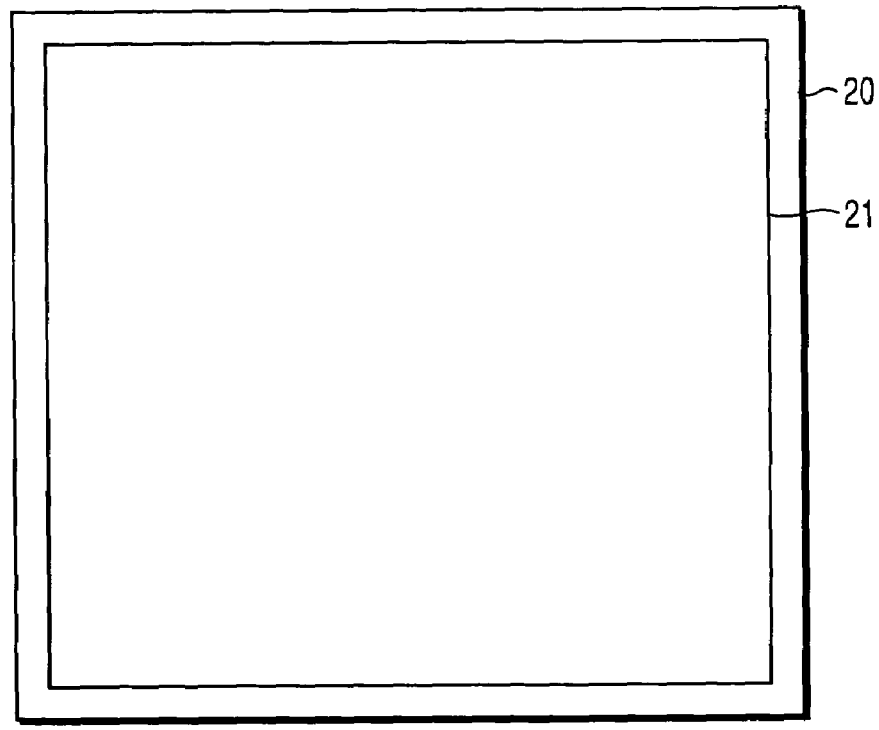
F I G. 7B

PROJECTION IMAGE DISPLAY APPARATUS AND COLOR CORRECTION METHOD FOR THE SAME

CROSS-REFERENCE TO RELATED APPLICATIONS

This application is based upon and claims the benefit of priority from prior Japanese Patent Application No. 2004-378072, filed Dec. 27, 2004, the entire contents of which are incorporated herein by reference.

BACKGROUND OF THE INVENTION

1. Field of the Invention

The present invention relates to a projection image display apparatus capable of projecting a color image on various color wall surfaces other than a white screen, and a color correction method for the same.

2. Description of the Related Art

In a projection image display apparatus which projects a color image on a projection surface using a transmission or reflection type display device, white balance is set for a white screen serving as the projection surface. Accordingly, when the color image is to be projected on the projection surface such as a wall surface having a color (chroma) different from that of the white screen, color correction must be performed for the color image to be projected.

As this type of correction mechanism, in, e.g., Jpn. Pat. Appln. KOKAI Publication No. 2003-323610, a color correction mechanism is available, in which reflected light of an image projected on the projection surface is received by a color sensor, and correction data is generated from the color difference between a projected color space and a color space obtained by the color sensor.

In the above-described color correction mechanism, the color sensor receives the reflection light of the image projected on the projection surface, and the correction data is generated from the color difference between the projected color space and the color space obtained by the color sensor. Hence, the projected image undergoes unique color correction in accordance with the characteristics and performances of the above-described elements. Accordingly, due to changes in environment, maintenance, and characteristics and performances of the above-described elements, the color varies in accordance with whether the image is projected onto the white screen or wall surface, thus posing a problem. In addition to this, in the color correction mechanism, many expensive parts are required.

BRIEF SUMMARY OF THE INVENTION

According to an embodiment of the present invention, a projection image display apparatus comprises a projection unit configured to project an image on a projection surface, a designation unit configured to designate a position of the image projected on the projection surface by the projection unit, a holding unit configured to hold a plurality of types of white balance adjustment color data with respect to colors of the plurality of projection surfaces on which the projection unit is configured to project the image, a projection control unit configured to cause the projection unit to simultaneously project, onto the projection surface, patterns having a plurality of colors based on the plurality of types of white balance adjustment color data held in the holding unit, upon dividing the patterns into areas configured to be selected for each pattern, a selection control unit configured to cause the designation unit to select a pattern which is whitest from the patterns having the plurality of colors projected on the projection surface, by a designation operation, a color data acquiring unit configured to, when a given pattern is selected from the patterns having the plurality of colors projected on the projection surface by the designation operation of the designation unit, acquire color data corresponding to the selected pattern from the plurality of types of white balance adjustment color data held in the holding unit, and a color correction unit configured to perform color correction of an image to be projected on the projection surface by the projection unit on the basis of the color data obtained by the color data acquiring unit.

According to an embodiment of the present invention, a color correction method for a projection image display apparatus, comprises holding a plurality of types of white balance adjustment color data corresponding to colors of a plurality of projection surfaces on which a projection unit is configured to project an image, causing the projection unit to simultaneously project patterns having a plurality of colors based on a plurality of types of held color data onto the projection surface, upon dividing the patterns into areas configured to be selected for each pattern, when a given pattern is selected from patterns having a plurality of colors projected on the projection surface, acquiring color data corresponding to the selected pattern from the plurality of types of held white balance adjustment color data, and causing the projection unit to perform color correction of an image to be projected onto the projection surface on the basis of the acquired color data.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4A is a view showing an example of an operation unit layout indicating an operation portion;

FIG. 4B is a view showing an example of an image displayed in accordance with the operation of the operation unit;

FIG. 5A is a view showing an example of an operation unit layout indicating an operation portion;

FIG. 5B is a view showing an example of an image displayed in accordance with the operation of the operation unit;

FIG. 7A is a view showing an example of an operation unit layout indicating an operation portion;

FIG. 7B is a view showing an example of an image displayed in accordance with the operation of the operation unit;

DETAILED DESCRIPTION OF THE INVENTION

An embodiment of the present invention will be described below with reference to the accompanying drawing.

Figure 1:
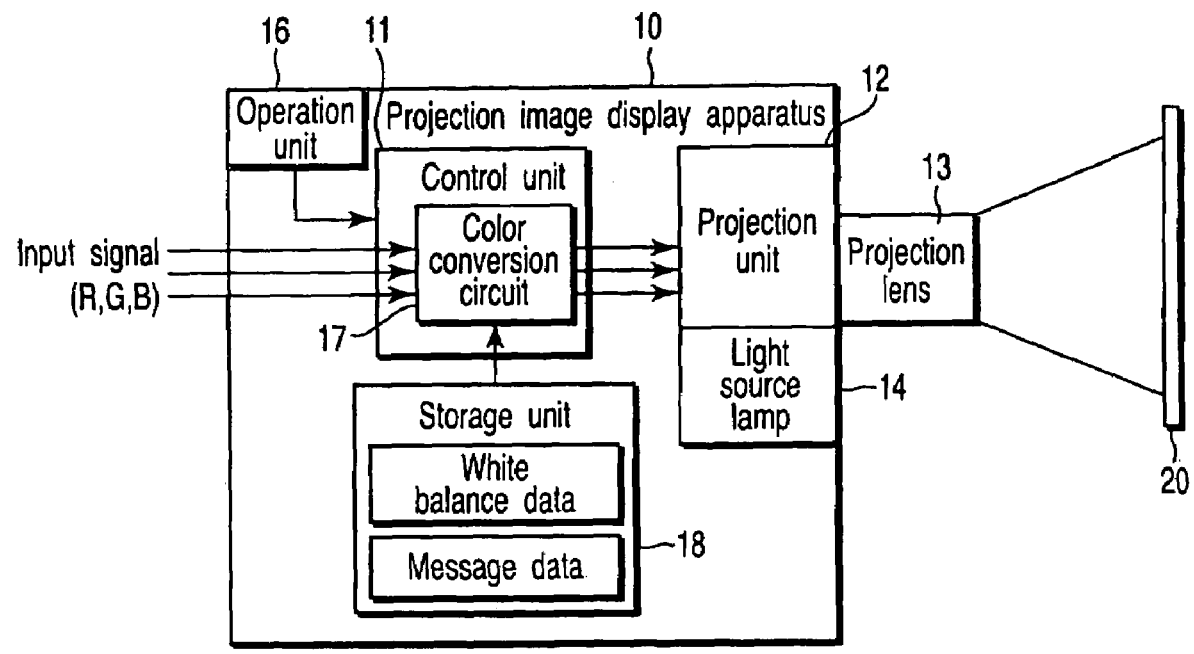
FIG. 1 is a block diagram showing an arrangement of a main part of a projection image display apparatus according to an embodiment of the present invention.

FIG. 1 shows an arrangement of a main part of a projection image display apparatus according to the embodiment of the present invention.

A projection image display apparatus 10 according to the embodiment of the present invention includes a control unit 11 having a color conversion circuit 17 and a storage unit 18, a projection unit 12 having a projection lens 13 and a light source lamp 14, and an operation unit 16 having a cross key and an operation button.

The control unit 11 controls the operations of the overall projection image display apparatus 10, and is implemented by a microprocessor. According to a program stored in the storage unit 18, the control unit 11 performs overall control of the apparatus. In this case, the process shown in FIG. 3 is performed in accordance with the program stored in the storage unit 18. In the process shown in FIG. 3, the control unit 11 causes the projection unit 12 to project a menu window 35 shown in FIG. 5B or a white balance adjustment window shown in FIG. 2 or 6B.

The projection unit 12 includes the projection lens 13, the light source lamp 14, and a transmission or reflection type display device (not shown). When a display image is formed on a display device under the control of the control unit 11, the projection unit 12 projects the image onto a screen or a wall surface 20 serving as a projection surface via the projection lens 13 using light from the light source lamp 14.

Under the control of the control unit 11, the color conversion circuit 17 performs color correction of display image data (R, G, B) using one of color data stored in the storage unit 18.

For example, the storage unit 18 stores a program including a processing routine shown in FIG. 3 executed by the control unit 11, and a plurality of types of white balance adjustment color data and message data corresponding to the color of each projection surface on which the projection image display apparatus 10 can project the image. In this embodiment, the above-described white balance adjustment color data is called white balance data.

Figure 2:
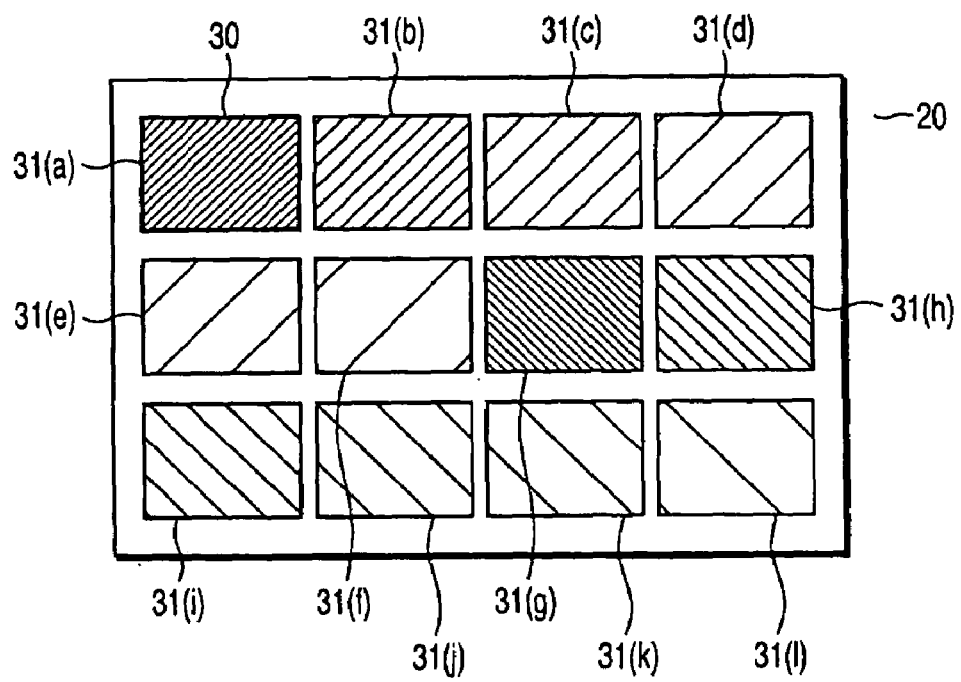
FIG. 2 is a view showing an arrangement of a white balance adjustment window according to the embodiment of the present invention.
Figure 3:
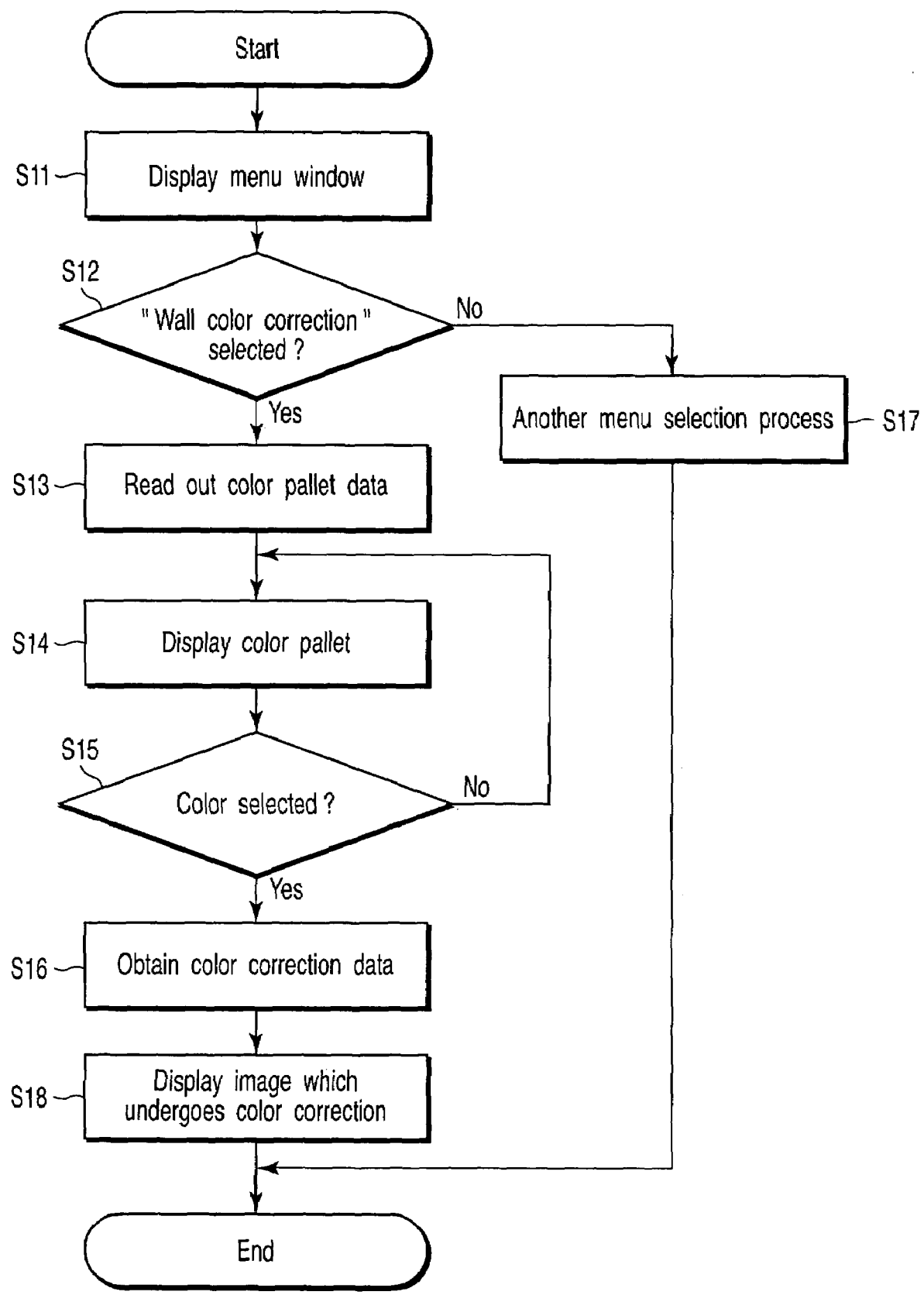
FIG. 3 is a flowchart showing a processing sequence of the projection image display apparatus according to the embodiment of the present invention.

FIG. 2 shows an arrangement of the white balance adjustment window applied to the color correction process according to the embodiment of the present invention.

This white balance adjustment window includes rectangular patterns (to be referred to as color pallets hereinafter) 31 of respective colors in a matrix. In the example shown in FIG. 2, 12 (4×3) color pallets 31(*a*), 31(*b*), . . . , 31(*l*) colored in different colors are aligned at predetermined gaps. Under the control of the control unit 11, these color pallets 31(*a*), 31(*b*), . . . , 31(*l*) are simultaneously projected onto the projection surface by the projection unit 12. In this case, a frame moving cursor (to be referred to as a frame cursor hereinafter) 30 is located at one of the above-described color pallets 31(*a*), 31(*b*), . . . , 31(*l*) so as to draw a box around each pallet. For example, in the initial state, the frame cursor 30 is located at the upper left color pallet 31(*a*) serving as a default pattern. The cross key arranged in the operation unit 16 can arbitrarily move the frame cursor 30 vertically and horizontally. The control unit 11 recognizes the position (position coordinates) of the frame cursor 30 in the above-described color pallets 31(*a*), 31(*b*), . . . , 31(*l*).

FIG. 3 shows a processing sequence performed by the control unit 11, and FIGS. 4A to 7B show the operation and state transition of this process.

When a power button 160 shown in FIG. 4A arranged in the operation unit 16 of the projection image display apparatus 10 is operated, and the projection image display apparatus 10 is turned on (power ON), the control unit 11 performs the process shown in FIG. 3 in accordance with the program stored in the storage unit 18.

First, the control unit 11 activates the projection unit 12. In this case, FIG. 4B shows a projection state wherein the projection unit 12 projects the image onto the screen or wall surface 20 serving as the projection surface. In this initial state, the image is not projected onto a projection area 21. Upon normal activation of the projection unit 12, the control unit 11 reads out initial menu window data included in the message data from the storage unit 18, and causes the display device of the projection unit 12 to display a menu window corresponding to the readout initial menu window data. Accordingly, the menu window 35 shown in FIG. 5B is projected on the screen or wall surface 20 serving as the projection surface (step S11).

When "wall color correction" is selected (step S12: Yes) from the menu window 35 by operating cross keys 162 and 163 shown in FIG. 5A, and a menu button 166 shown in FIG. 5A is operated, the color correction process starts. When a menu other than "wall color correction" is selected (step S12: No), another menu selection process is performed (step S17).

In this color correction process, the control unit 11 reads out the white balance data from the storage unit 18 (step S13). On the basis of the data, the control unit 11 generates the display data to be displayed on the white balance adjustment window including the 12 color pallets 31(*a*), 31(*b*), . . . , 31(*l*) shown in FIG. 2. In addition to this, the control unit 11 reads out color correction guide message data from the storage unit 18, and generates the display data of this guide message. The control unit 11 then causes the display device of the projection unit 12 to display these display data. Accordingly, the white balance adjustment window including the 12 color pallets 31(*a*), 31(*b*), . . . , 31(*l*) shown in FIG. 6B and a guide message 36 are projected on the projection area 21 in the screen or wall surface 20 serving as the projection surface (step S14).

Figure 6A:
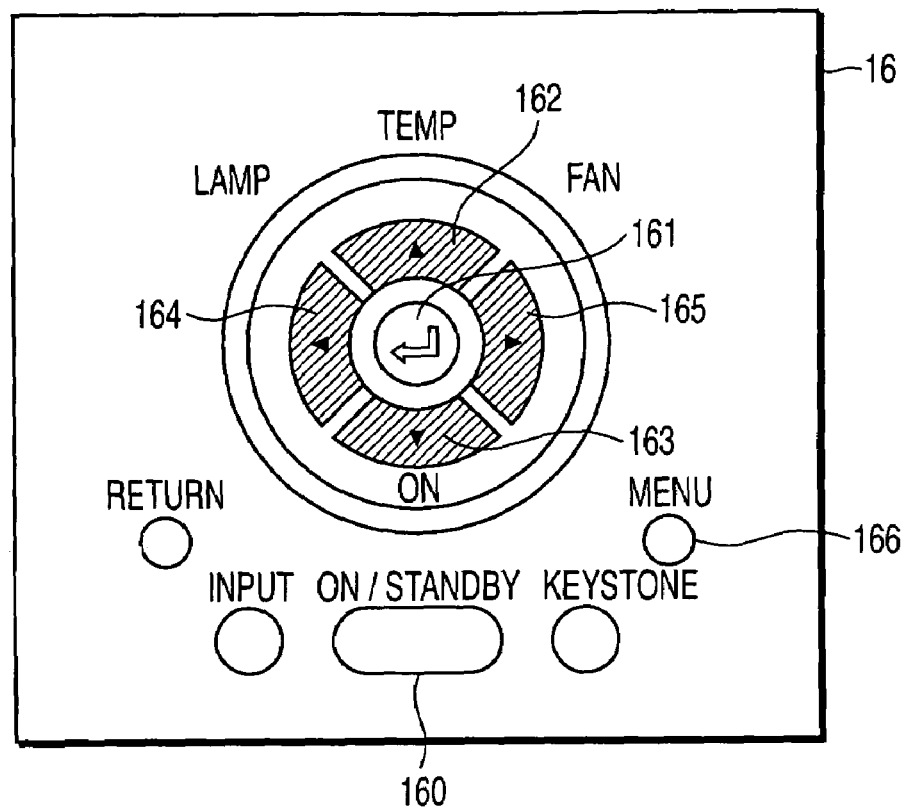
FIG. 6A is a view showing an example of an operation unit layout indicating an operation portion.
Figure 6B:
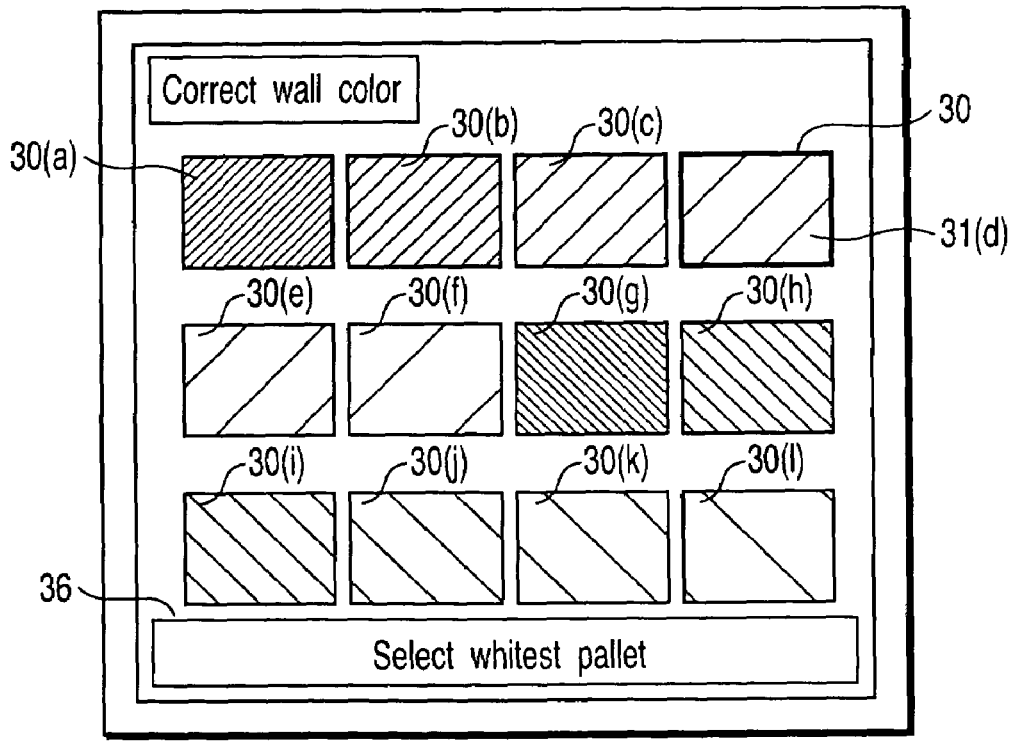
FIG. 6B is a view showing an example of an image displayed in accordance with the operation of the operation unit.

On the white balance adjustment window, upon operation of the cross keys 162 to 165 shown in FIG. 6A, the frame cursor 30 moves between the color pallets. The frame cursor 30 is located at the color pallet having the whitest color to select this pallet (step S15: Yes). In this state, upon operation of the a determination button 161 shown in FIG. 7A, the control unit 11 acquires, from the storage unit 18, the white balance data corresponding to the selected color pallet as the color correction data used for following image display. The control unit 11 then performs and sets the color correction (step S16). After that, the image which undergoes color correction is displayed (step S18). Note that, when the above-described frame cursor 30 is operated, under the control of the control unit 11, the color of the frame cursor 30 is changed in accordance with the color pallet at which the frame cursor 30 is located. In this case, when the frame cursor 30 is located at a given color pallet, the frame cursor 30 is projected in a specific color (e.g., red or green) obtained upon color correction in accordance with the color pallet at which the frame cursor 30 is located. Therefore, in accordance with the color state of the frame cursor 30, the condition of the specific color of the selected color pallet at which the frame cursor 30 is located can be recognized.

Alternatively, in step S15, when no color pallet is selected (step S15: No), the flow returns to step S14.

On the basis of the white balance data (color correction data) obtained by performing and setting color correction as described above, the control unit 11 causes the color conversion circuit 17 to perform a color conversion process of the display image data (R, G, B) input to the projection image display apparatus 10. In this case, when the maximum number of gradation levels of R, G, and B is, e.g., 255, in correspondence with the plurality of projection surfaces (wall surfaces) on which the projection unit 12 can project the images, the storage unit 18 stores the white balance data based on each color of the projection surface, such as a white balance data [R:255, G: 180, B: 255] for a greenish wall, or a white balance data [R: 180, G: 255, B: 255] for a reddish wall with respect to a reference white balance data (R:255, G: 255, B: 255).

By performing the above-described color correction process in the embodiment, color correction based on the color of each projection surface can be quickly and precisely performed by simple operation.

Figure 8A:
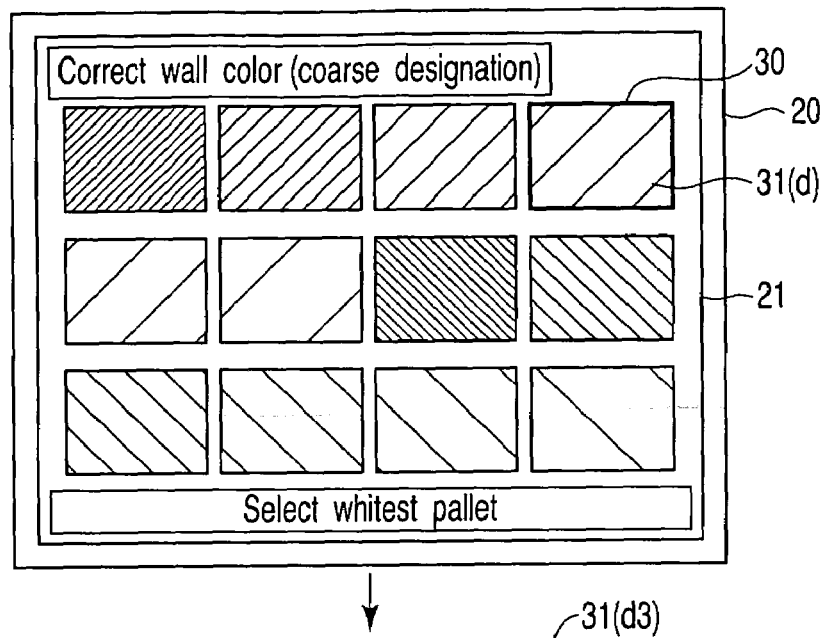
FIG. 8A is a view for explaining an expansion example of the embodiment of the present invention (coarse designation)
Figure 8B:
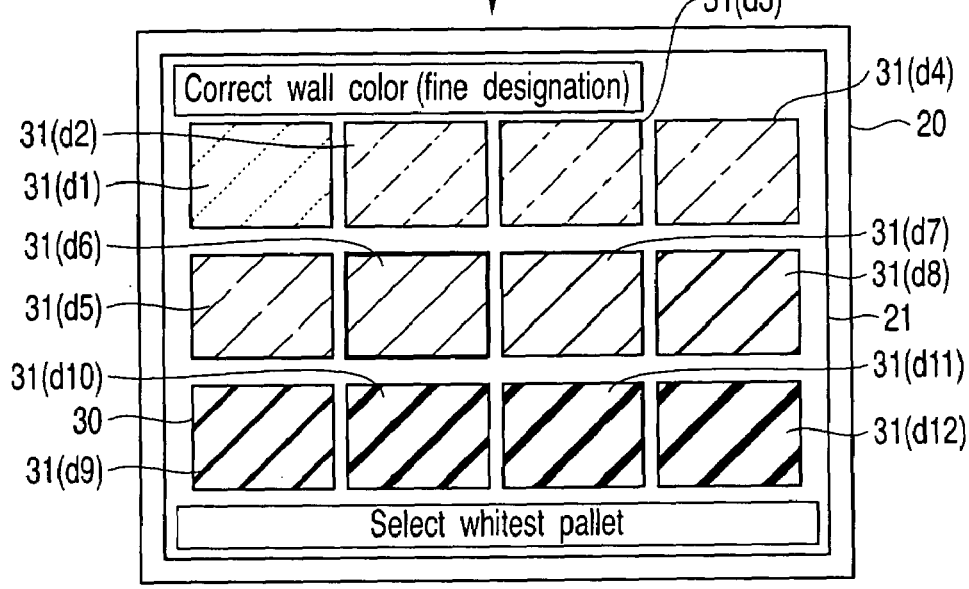
FIG. 8B is a view for explaining the expansion example of the embodiment of the present invention (fine designation).

FIGS. 8A and 8B show extended examples of the above-described embodiment of the present invention. In these extended examples shown in FIGS. 8A and 8B, an approximate color (yellow, orange, blue, or the like) of the wall is designated using a white balance approximate adjustment window shown in FIG. 8A. Next, the approximately designated wall color is further designated precisely using a white balance precise adjustment window shown in FIG. 8B. Since such a color pallet designation (selection) means is used, color correction can be performed on the basis of a precise color.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection image display apparatus comprising:
   a projection unit configured to project an image on a projection surface;
   a designation unit configured to designate a position of the image projected on the projection surface by the projection unit;
   a holding unit configured to hold a plurality of types of white balance adjustment color data with respect to colors of said plurality of projection surfaces on which the projection unit is configured to project the image;
   a projection control unit configured to cause the projection unit to simultaneously project, onto the projection surface, patterns having a plurality of colors based on said plurality of types of white balance adjustment color data held in the holding unit, upon dividing the patterns into areas configured to be selected for each pattern;
   a selection control unit configured to cause the designation unit to select a pattern which is whitest from the patterns having said plurality of colors projected on the projection surface, by a designation operation;
   a color data acquiring unit configured to, when a given pattern is selected from the patterns having said plurality of colors projected on the projection surface by the designation operation of the designation unit, acquire color data corresponding to the selected pattern from said plurality of types of white balance adjustment color data held in the holding unit; and
   a color correction unit configured to perform color correction of an image to be projected on the projection surface by the projection unit on the basis of the color data obtained by the color data acquiring unit.

2. An apparatus according to claim 1, wherein the selection control unit comprises an indicating unit which indicates a circumference of a given pattern serving as a current selection target using a frame cursor to project the image onto the projection surface.

3. An apparatus according to claim 2, wherein when the pattern surrounded by the frame cursor is selected by the designation operation of the designation unit, the indication unit causes the cursor to have a specific color to be projected on the projection surface.

4. An apparatus according to claim 1, wherein the projection control unit further comprises a simultaneous projection unit which causes the projection unit to simultaneously project the patterns having a plurality of colors approximate to the color of the selected pattern onto the projection surface, upon dividing the patterns into areas configured to be selected for each pattern, when a given pattern of the patterns having said plurality of colors projected on the projection surface is selected by the designation operation of the designation unit.

5. A color correction method for a projection image display apparatus, comprising:
   holding a plurality of types of white balance adjustment color data corresponding to colors of a plurality of projection surfaces on which a projection unit is configured to project an image;
   causing the projection unit to simultaneously project patterns having a plurality of colors based on a plurality of types of held color data onto the projection surface, upon dividing the patterns into areas configured to be selected for each pattern;
   when a given pattern is selected from patterns having a plurality of colors projected on the projection surface, acquiring color data corresponding to the selected pattern from said plurality of types of held white balance adjustment color data; and
   causing the projection unit to perform color correction of an image to be projected onto the projection surface on the basis of the acquired color data.

* * * * *